(No Model.)
T. & J. CUMMINGS.
COMBINATION PICK AND SHOVEL.
No. 534,321. Patented Feb. 19, 1895.
Fig. 1.     Fig. 2.     Fig. 3.     Fig. 4.
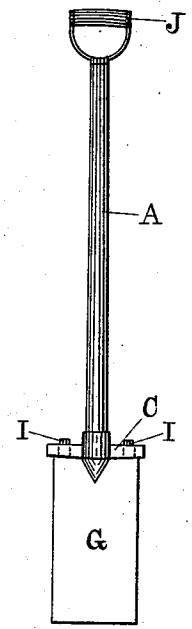
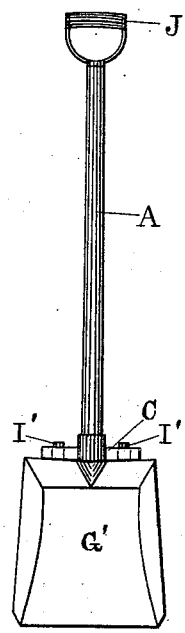
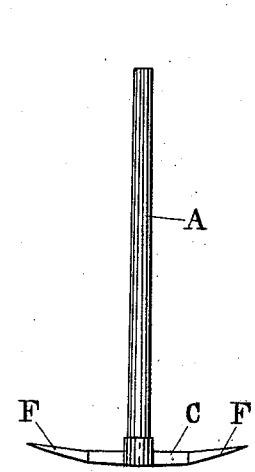
Fig. 5.
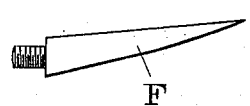
Fig. 6.     Fig. 7.
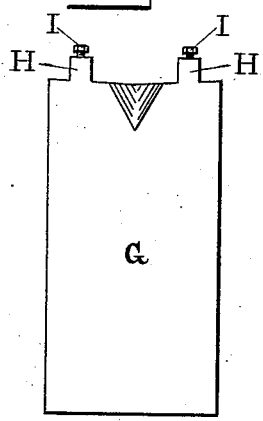
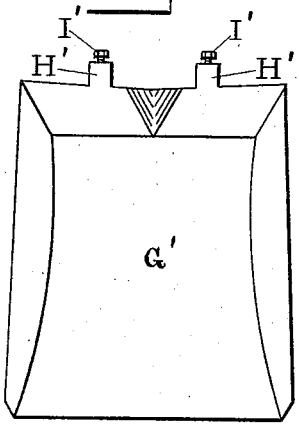
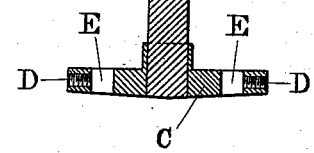
Fig. 8.
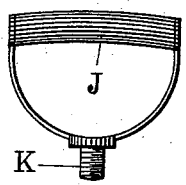
Witnesses
H. Alber
R. A. McAdory
Inventors
Sarah J. Cummings
By their Attorney P. Byrne

UNITED STATES PATENT OFFICE.

THOMAS CUMMINGS AND JOSEPH CUMMINGS, OF HARTRANFT, TENNESSEE.

COMBINATION PICK AND SHOVEL.

SPECIFICATION forming part of Letters Patent No. 534,321, dated February 19, 1895.

Application filed December 5, 1894. Serial No. 530,846. (No model.)

*To all whom it may concern:*

Be it known that we, THOMAS CUMMINGS and JOSEPH CUMMINGS, citizens of the United States, residing at Hartranft, in the county of Claiborne and State of Tennessee, have invented certain new and useful Improvements in a Combination Pick and Shovel; and we do hereby declare the following to be a full, clear, and exact description of the invention, such as will enable others skilled in the art to which it appertains to make and use the same.

Our invention relates to improvements in a combination tool, consisting of a pick, a spade, and a shovel all interchangeable on the same handle; and the objects of our improvement are, first, to provide a pick head having a handle attached to the head by an eye in the usual manner the head provided with removable pick points attached to the head by screw threads; second, to provide a pick head attached to a handle the head provided with oblong apertures adapted to attach a spade or a shovel blade to the pick head as desired; third, to provide a pick head attached to a handle the head provided with apertures to attach a spade or a shovel blade thereto the end of the handle provided with a detachable hand hold to adapt the pick handle to be used with a spade or a shovel when desired. We attain these objects by the device and arrangement of the parts illustrated in the accompanying drawings, in which—

Figure 1 is a vertical view of the device arranged to form a spade. Fig. 2, is a vertical view of the device changed to form a shovel. Fig. 3, is a vertical view arranged to form a pick. Fig. 4, is an enlarged detail vertical sectional view of the pick handle and head. Fig. 5, is an enlarged detail plan view of one of the points to form the pick. Fig. 6, is an enlarged detail plan view of the spade blade. Fig. 7, is an enlarged detail plan view of the shovel blade. Fig. 8, is an enlarged detail plan view of the detachable hand hold for the end of the handle.

Similar letters refer to similar parts throughout the several views.

The handle A is made of wood, of the usual form as generally used for pick handles. The end of the handle is provided with a screw threaded recess B. The recess is for the purpose of attaching a hand hold to the end of the handle, when used as a spade or a shovel, as hereinafter described.

The metallic head C is formed in the same manner as the head of a pick. The head is provided with an eye, to attach the head to the handle in the usual manner. Screw threaded recesses D. D are formed in the ends of the head to attach the pick points. Two oblong apertures E. E are formed in the arms of the head, to attach a spade or a shovel as hereinafter described. Two pick points F. F are provided. The points have screw-threaded pins formed on their ends, to attach them to the ends of the head. When so attached, they form the pick complete as shown in Fig. 3.

The spade blade G is made of steel or other suitable metallic material in the usual manner. The upper edge of the blade is provided with two lugs H. H, the lugs having screw-threaded pins formed on the upper edge, the pins provided with nuts I. I to screw on the pins in the usual manner. To form the spade, the points F. F are detached from the head, and the lugs H. H on the spade inserted in the apertures E. E formed in the head. The nuts I. I when screwed to place, secure the spade blade to the head, as shown in Fig. 1.

The shovel blade G' is made of steel or suitable metallic material in the usual manner. The upper edge of the blade is provided with lugs H'. H' having screw-threaded pins as described for the spade, the pins having nuts I'. I' to secure the shovel blade to the head, in the same manner as described for the spade. The shovel when so formed appears as shown in Fig. 2.

A hand hold J made of any suitable metallic material is provided. The hand hold has a screw-threaded pin K formed on its lower end. The pin attaches the hand hold to the end of the handle, when used as a spade or a shovel, as shown in Figs. 1 and 2.

Having thus described our invention, what we claim as new, and desire to secure by Letters Patent, is—

A combination tool comprising the handle with pick-head attached thereto, said pick-head formed with screw-threaded recesses in the ends to attach pick-points, apertures to attach a spade or a shovel blade, and a spade or shovel blade having lugs with screw-threaded pins formed on the upper edge of the blade, the lugs being adapted to secure the spade or shovel to the pick-head, and a handhold having a screw-threaded pin formed on its end adapted to be attached to the end of the handle, substantially as and for the purpose described.

In testimony whereof we affix our signatures in presence of two witnesses.

THOMAS CUMMINGS.
JOSEPH CUMMINGS.

Witnesses:
W. S. COCHRAN,
WALTER H. LOZENBY.